United States Patent [19]

Höppner et al.

[11] Patent Number: 4,958,602
[45] Date of Patent: Sep. 25, 1990

[54] INTERNAL COMBUSTION ENGINE

[75] Inventors: Klaus Höppner, Marbach; Reinhard Friedrich, Waiblingen; Hermann Weiss, Steinheim, all of Fed. Rep. of Germany

[73] Assignee: Andreas Stihl, Waiblingen, Fed. Rep. of Germany

[21] Appl. No.: 424,821

[22] Filed: Oct. 20, 1989

[30] Foreign Application Priority Data

Oct. 25, 1988 [DE] Fed. Rep. of Germany ....... 3836272

[51] Int. Cl.$^5$ .............................................. F02F 7/00
[52] U.S. Cl. ............................ 123/195 C; 123/195 H; 384/432
[58] Field of Search ........ 123/195 C, 195 HC, 195 H; 184/6.5; 384/429, 432

[56] References Cited

U.S. PATENT DOCUMENTS

| 2,945,715 | 7/1960 | Burrell | 123/195 C |
| 3,304,134 | 2/1967 | Allen | 384/432 |
| 4,189,193 | 2/1980 | Schumacher | 384/432 |
| 4,287,861 | 9/1981 | Lettner et al. | 123/195 C |
| 4,546,738 | 10/1985 | Visek | 123/195 C |
| 4,651,691 | 3/1987 | Ogawa | 123/195 H |
| 4,693,216 | 9/1987 | Ampferer et al. | 123/195 C |
| 4,753,201 | 6/1988 | Fukuo et al. | 123/195 C |
| 4,836,159 | 6/1989 | Löbig | 123/195 H |
| 4,854,746 | 8/1989 | Baugh et al. | 384/432 |

FOREIGN PATENT DOCUMENTS

| 0659068 | 3/1963 | Canada | 384/429 |
| 3309792 | 9/1984 | Fed. Rep. of Germany | 384/429 |

Primary Examiner—David A. Okonsky
Assistant Examiner—Weilun Lo
Attorney, Agent, or Firm—Walter Ottesen

[57] ABSTRACT

The invention relates to internal combustion engines and especially to two-stroke engines for portable handheld work tools such as motor-driven chain saws or the like. Material made of light metal alloys is used in two-stroke engines for portable handheld tools in order to save weight. Thus, the crankshaft bearing is made of steel while the bearing covers holding the bearing are made of a magnesium alloy. Heating causes the bearing cover to expand by an amount greater than the crankshaft bearing whereby the press fit of the crankshaft bearing can become endangered and, in an extreme case, a clearance can develop between the crankshaft bearing and the bearing cover. According to the invention, the press fit between the crankshaft bearing and the bearing cover is maintained by placing a plastic annular segment therebetween having a thermal expansion coefficient so selected that it compensates for the different thermal expansions of the bearing cover and the bearing.

16 Claims, 2 Drawing Sheets

INTERNAL COMBUSTION ENGINE

FIELD OF THE INVENTION

The invention relates to an internal combustion engine and especially a two-stroke engine for portable handheld tools such as motor-driven chain saws, cutoff machines, brushcutters or the like.

BACKGROUND OF THE INVENTION

In internal combustion engines utilized in portable handheld tools, the use of light metal alloys is increasing in order to keep the weight of the tool within tolerable limits. This leads to critical conditions at the supporting faces of components of different materials in the presence of heat and these conditions can affect the function of the components.

Accordingly, for small internal combustion engines such as two-stroke engines for portable handheld tools, it is known to fix a crankshaft bearing made of steel by means of a bearing cover made of light metal such as a magnesium alloy with the crankshaft bearing being mounted in a bearing seat of an upper portion of a crankcase housing. However, the bearing cover expands considerably more than the crankshaft bearing in the presence of heat because of the different materials so that the press fit of the crankcase bearing in the bearing seat is endangered.

The cast bearing cover is very precisely machined to within a few microns in order to maintain the press fit within a tight temperature range. This machining operation is complex and time consuming and increases the cost of the bearing cover considerably.

Even with a bearing cover which is machined to high precision, a loosening of the press fit or even a clearance between the bearing cover and the crankcase bearing cannot be excluded because of the high temperatures (approximately 120° C.) which develop when the engine is operating in the range of maximum load.

SUMMARY OF THE INVENTION

It is an object of the invention to configure a bearing seat made of materials having different heat expansion coefficients such that a crankshaft bearing can be reliably held by means of a press fit in the bearing seat even in the presence of high temperatures without complex machining.

The invention is directed to an internal combustion engine which includes a crankshaft and can be a two-stroke engine for portable handheld tools such as a motor-driven chain saw, cutoff machine, brushcutter or the like. The internal combustion engine includes: an engine block having a cylinder and crankcase upper part extending from the cylinder; a bearing cover connected to the crankcase upper part so as to define a partition interface therebetween; the crankcase upper part and the bearing cover conjointly defining a bearing seat at the interface; a crankshaft bearing seated in the bearing seat for rotatably journalling the crankshaft therein; the bearing cover being made of a material having a thermal expansion coefficient greater than the bearing thereby causing a clearance to develop between the cover and the bearing in the presence of heat developed in the engine during the operation thereof; receiving space means formed in at least a portion of the bearing seat so as to define an opening facing toward the bearing; an annular segment disposed in the receiving space means; and, the annular segment having a thermal expansion coefficient at least equal to the difference between the thermal expansion coefficient of the bearing cover and the thermal expansion coefficient of the bearing thereby causing the annular segment to expand during operation of the engine and compensate for the clearance by applying a holding force to the bearing.

The arrangement of at least one annular segment on the periphery of the crankshaft bearing compensates for the occurring heat expansions in a simple manner. The receiving space means can be a receiving cavity for the annular segment and is adapted volumetrically to the volume of the annular segment at room temperature. This cavity assures that an expansion of the ring segment is only possible in the direction of the crankshaft bearing whereby the annular segment applies a pressure force on the crankshaft bearing similar to a hydraulic fluid by means of which the press fit of the crankshaft bearing in the bearing seat is maintained. The volumetrically adapted receiving cavity is easily produced by pouring the annular segment.

The machining of the bearing shell made of light metal, preferably a magnesium alloy, is completely unnecessary because of the arrangement of the invention of the annular segment which compensates for thermal expansions. The precision obtainable by the casting process in the range of 4/100 mm is sufficient for maintaining the press fit over a wide temperature range.

Pursuant to a further feature of the invention, the annular segment is configured as a half ring made of a plastic such as polyacetal, polyamide or the like. The half ring is held in an annular slot in the bearing cover. The cross section of the annular segment is advantageously formed to be approximately rectangular and is preferably trapezoidal. The annular segment can also have a triangular cross section or a circular or semicircular cross section.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
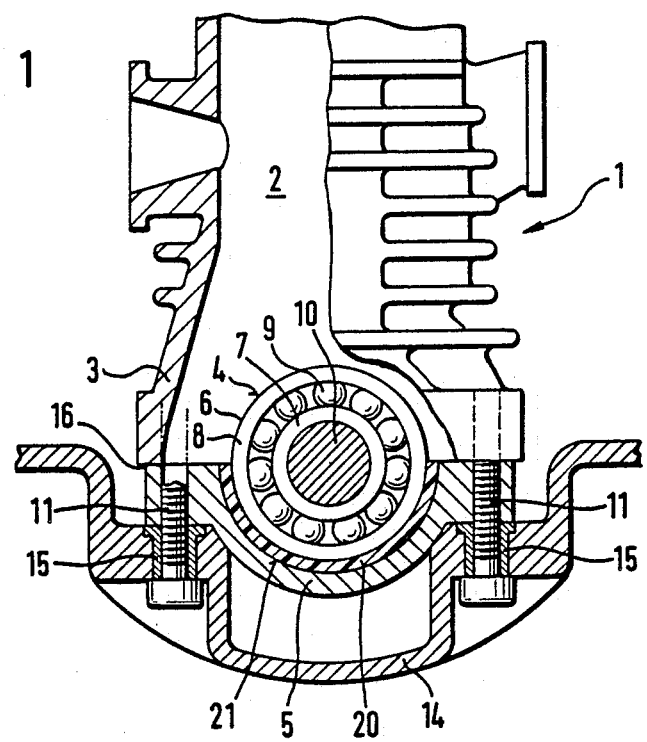
FIG. 1 is a side elevation view of a portion of the internal combustion engine according to the invention with a portion of the upper crankcase housing part broken away to show the crankshaft bearing.
Figure 2:
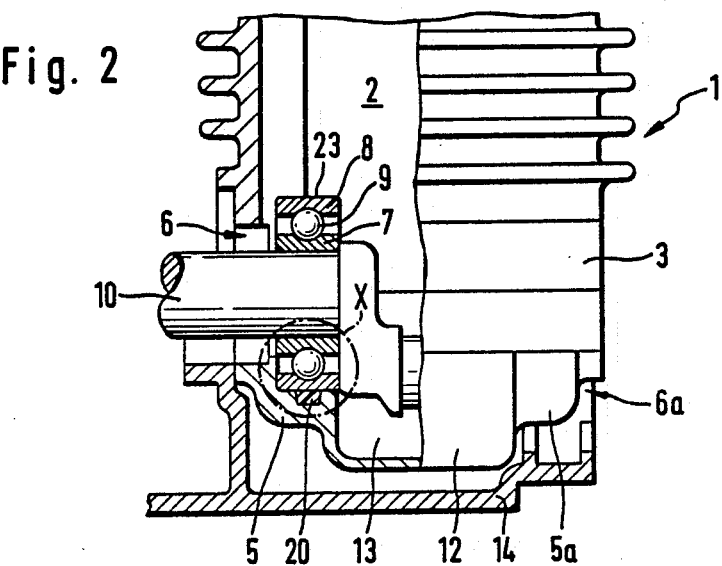
FIG. 2 is a section view taken through the crankshaft bearing of FIG. 1.

The internal combustion engine shown in FIGS. 1 and 2 is preferably a two-stroke engine for portable handheld tools such as motor-driven chain saws, cutoff machines, brushcutters or the like. The engine is preferably configured as a single cylinder engine and comprises an engine block 1 which includes a cylinder 2 having inlet and outlet channels and a crankcase upper part 3.

A bearing half shell 4 is formed in the crankcase upper part 3 and a bearing cover 5 is fastened to the crankcase upper part 3 with threaded fasteners 11. The bearing half shell 4 and the bearing cover 5 conjointly define a bearing seat for a crankshaft bearing 6. The crankshaft bearing comprises an inner race 7 and an outer race 8 with roller elements in the form of bearing balls 9 interposed between the races 7 and 8. The outer race 8 is held between the bearing cover 5 and the bearing half shell 4 by means of a press fit by appropriately tightening the bearing cover fasteners 11. The inner race 7 is pushed over one end of a crankshaft 10.

As shown in FIG. 2, the crankshaft 10 is held at one end thereof by the crankshaft bearing 6 and, at its other end, the crankshaft 10 is held rotatably by the crankshaft bearing (not shown) located at 6a in the engine block 1.

The two bearing covers (5, 5a) are portions of a closure cover 12 which closes off the crankcase upper part 3 at its end facing away from the cylinder 2 thereby delimiting the crankcase chamber 13.

In addition to holding the closure cover 12 with the bearing covers (5, 5a), the bearing cover fasteners 11 hold a housing part 14 made of an aluminum alloy or the like. Supporting sleeves 15 are embedded in the lightweight housing part 14 so that the necessary holding forces for holding the bearing covers (5, 5a) can be developed.

The engine block 1 is cast from cast iron or from another alloy. The bearing half shell 4 is formed in the crankcase upper part 3 by means of appropriate machining operations. The crankshaft bearing (6, 6a) is made of steel whereas the bearing cover (5, 5a) is made of a light-metal alloy in order to reduce weight and this alloy is preferably a magnesium alloy.

At least one tolerance compensating annular segment 20 is arranged between the crankshaft bearings (6, 6a) and the bearing seats for compensating for the thermal expansions occurring during heating. The annular segment 20 is held in an open receiving cavity 21. The annular segment 20 comprises a material having a thermal expansion coefficient which is at least equal to the difference between the thermal expansion coefficients of the bearing cover and the crankshaft bearing 6. In this manner, the press fit between the bearing cover 5 and the crankshaft bearing 6 is maintained notwithstanding the greater thermal expansion of the bearing cover 5 because the difference of the thermal expansion is compensated by the annular segment 20. For this purpose, the volume of the receiving cavity 21 corresponds approximately to the volume of the annular segment 20 at room temperature and this is easily obtained by pouring the annular segment. In this way, the annular segment is volumetrically enclosed and can expand when heated only in the direction of the crankshaft bearing 6 and the volumetric expansion coefficient determines this expansion. The annular segment therefore lies against the outer race 8 of the crankshaft bearing 6 and applies a pressure force to the outer race 8 in the manner of a hydraulic liquid whereby the press fit of the crankshaft bearing 6 is maintained.

A plurality of annular segments 20 can be arranged about the periphery of the crankshaft bearing 6 in order to ensure that the press fit is maintained even at a greater warming of the bearing cover.

According to a preferred embodiment of the invention, an annular slot open to the partition plane 16 is formed as a receiving cavity 21. An annular segment 20 in the form of a half ring is seated in this annular slot 21. The half ring 20 lies in a receiving cavity 21 open only to the outer race 8 of the crankshaft bearing 6 because the annular slot 21 is closed in the peripheral direction at the partition plane 16 by the crankcase upper part 3.

It can be advantageous to provide the receiving cavity 21 in the crankcase upper part 3 in lieu of the bearing cover 5. In specific cases, it can be advantageous to arrange the receiving cavity partially in the bearing cover and partially in the crankcase upper part or even in component spaces separated from each other in the peripheral direction.

Figure 3:
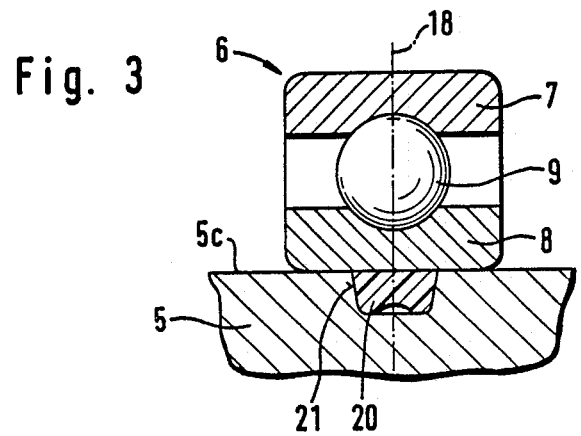
FIG. 3 is an expanded view of detail X of FIG. 2.

The detail X of FIG. 2 enlarged in FIG. 3 shows the arrangement and configuration of the annular segment 20 with reference to the bearing 6. The radial center plane 17 (FIG. 4) of the annular segment 20 lies precisely on the radial center plane 18 of the bearing 6. The peripheral surface 22 of the annular segment 20 facing inwardly thereby lies centrally on the outer peripheral surface 23 of the outer race 8 when viewed in the axial direction.

Figure 4:
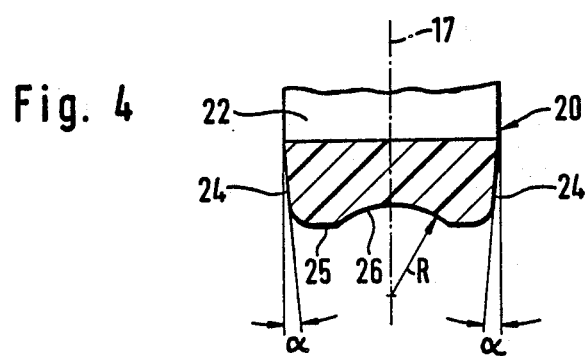
FIG. 4 is an axial section taken through an annular segment according to a feature of the invention; and, FIG. 5 is an expanded view of the detail X of FIG. 2 at increased temperature.
Figure 5:
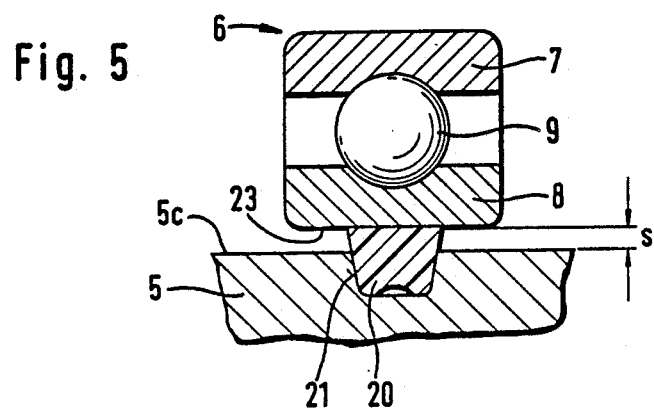

As shown in FIG. 4, the annular segment 20 is approximately rectangularly shaped when viewed in cross section with the axial end faces 24 defining an acute angle $\alpha$ with the radial center plane 17 of the annular segment. That is, imaginary extensions of the axial end faces then intersect the radial center plane 17 and define an acute angle $\alpha$ therewith. The cross section of annular segment 20 is slightly trapezoidal in shape. The acute angle $\alpha$ is preferably approximately 5°. This form facilitates the seating of the annular segment 20 in the receiving cavity 21 which is preferably configured to have a cross section corresponding to that of the annular segment.

A recess 26 in the form of a concave channel having a radius R is provided in the outer peripheral surface 25 of the annular segment which faces toward the base of the receiving cavity 21 when the annular segment is fitted into the cavity. This recess 26 preferably extends along the peripheral surface 25.

The annular segment 20 is made of a plastic which is preferably a plastic such as polyacetal (POM) or polyamide. In this way, the thermal expansion coefficient of the annular segment 20 is so selected that it is at least equal to the thermal coefficients of expansion of the bearing cover or the thermal coefficient of expansion of the crankshaft bearing. Preferably, the thermal expansion coefficient of the annular segment is greater than that of the crankshaft bearing and is preferably greater than that of the bearing cover.

FIG. 3 shows the arrangement at room temperature (20° C.) and for this condition, the annular segment 20 lies completely in the volumetrically adapted receiving cavity 21. The peripheral surface 23 of the outer race 8 then lies against the bearing cover 5 as well as the annular segment 20.

If the bearing cover 5 expands in response to heat more than the crankshaft bearing 6, then a clearance (s) develops between the outer peripheral surface of the outer race 8 and the surface 5a of the bearing cover 5 facing the outer race 8. The annular segment 20 which is also heated likewise expands but can only expand in the direction toward the crankshaft bearing 6. As described above, the receiving cavity 21 is volumetrically adapted to the annular segment 20 at room temperature and is open only in the direction toward the crankshaft bearing 6. The annular segment 20 bridges the clearance (s) because of the selected materials and thermal expansion coefficients and applies a pressing force against the outer race 8 directed radially toward the center of the bearing seat in the manner of a hydraulic liquid which assures that the press fit is maintained.

It is understood that the foregoing description is that of the preferred embodiments of the invention and that various changes and modifications may be made thereto without departing from the spirit and scope of the invention as defined in the appended claims.

What is claimed is:

1. An internal combustion engine such as a two-stroke engine for portable handheld tools such as a motor-driven chain saw, cutoff machine, brushcutter or the like, the internal combustion engine including a crankshaft and comprising:

an engine block including a cylinder and crankcase upper part extending from said cylinder;

a bearing cover connected to said crankcase upper part so as to define a partition interface therebetween;

said crankcase upper part and said bearing cover conjointly defining a bearing seat at said interface;

a crankshaft bearing seated in said bearing seat for rotatably journalling the crankshaft therein;

said bearing cover being made of a material having a thermal expansion coefficient greater than said bearing thereby causing a clearance to develop between said cover and said bearing in the presence of heat developed in the engine during the operation thereof;

receiving space means formed to extend over at least a portion of said bearing seat so as to define a receiving space between said bearing cover and said bearing;

an annular segment disposed in said receiving space; and, said annular segment having a thermal expansion coefficient selected so as to cause aid annular segment to expand during operation of the engine and fill out said clearance thereby applying a holding force to said bearing.

2. The internal combustion engine of claim 1, said annular segment having a predetermined volume at room temperature; and, said receiving space means having a volume corresponding to said volume of said annular segment at room temperature.

3. The internal combustion engine of claim 1, said annular segment having an approximately rectangular cross section.

4. The internal combustion engine of claim 1, said annular segment having an approximately trapezoidal cross section.

5. The internal combustion engine of claim 4, the crankshaft defining a longitudinal axis and said annular segment defining a radial plane perpendicular to the longitudinal axis of the crankshaft; said annular segment defining axial end faces disposed in respective end face planes; each of said end face planes defining an acute angle ($\alpha$) with said radial plane; and, said end face planes intersecting said radial plane outside of said annular segment when extended beyond said end faces.

6. The internal combustion engine of claim 5, said acute angle ($\alpha$) being approximately 5°.

7. The internal combustion engine of claim 1, said annular segment having a radial outer peripheral surface seated in said receiving space means; and, recess means formed in and along said peripheral surface.

8. The internal combustion engine of claim 7, said recess means being a recess formed in said radial outer peripheral surface, and said recess having a concave contour of partially circular shape when viewed as a cross section of said annular segment.

9. The internal combustion engine of claim 1, said bearing seat being partitioned at said interface so as to define two bearing seat halves; said receiving space means being formed in one of said seat halves; and, said annular segment being a half ring seated in said receiving space means in the one seat half.

10. The internal combustion engine of claim 9, said receiving space means in the one seat half being an open half annular slot.

11. The internal combustion engine of claim 1, said bearing seat being partitioned at said interface so as to define two bearing seat halves; one of said bearing seat halves being formed in said bearing cover; and, said receiving space means being formed in the one bearing seat half corresponding to said bearing cover.

12. The internal combustion engine of claim 1, said annular segment being made of plastic.

13. The internal combustion engine of claim 12, said plastic being selected from the group consisting of polyacetal (POM) or a polyamide.

14. The internal combustion engine of claim 1, said thermal expansion coefficient of said annular segment being greater than the thermal expansion coefficient of said bearing.

15. The internal combustion engine of claim 1, said thermal expansion coefficient of said annular segment being greater than the thermal expansion coefficient of said material of said bearing cover.

16. The internal combustion engine of claim 1, said annular segment being formed by pouring the material of which it is made into said bearing seat.

* * * * *

UNITED STATES PATENT AND TRADEMARK OFFICE
CERTIFICATE OF CORRECTION

PATENT NO. : 4,958,602

DATED : September 25, 1990

INVENTOR(S) : Klaus Höppner, Reinhard Friedrich and Hermann Weiss

It is certified that error appears in the above-identified patent and that said Letters Patent is hereby corrected as shown below:

```
    In column 4, line 56: delete "5a" and substitute
-- 5c -- therefor.

In column 5, line 34: delete "aid" and substitute
-- said -- therefor.
```

Signed and Sealed this

Third Day of March, 1992

*Attest:*

HARRY F. MANBECK, JR.

*Attesting Officer*      *Commissioner of Patents and Trademarks*